United States Patent [19]

Ueyama et al.

[11] Patent Number: 5,739,609
[45] Date of Patent: Apr. 14, 1998

[54] MAGNETIC BEARING APPARATUS

[75] Inventors: Hirochika Ueyama, Hirakata; Manabu Taniguchi, Kashihara, both of Japan

[73] Assignee: Koyo Seiko Co., Ltd., Osaka, Japan

[21] Appl. No.: 827,605

[22] Filed: Apr. 9, 1997

[51] Int. Cl.[6] ........................................................ H02K 7/09
[52] U.S. Cl. ................................ 310/90.5; 364/474.16; 451/294
[58] Field of Search ........................ 310/90.5; 364/474.16; 451/294, 9

[56] References Cited

U.S. PATENT DOCUMENTS

| | | | |
|---|---|---|---|
| 4,340,261 | 7/1982 | Wehde | 310/90.5 |
| 5,027,280 | 6/1991 | Ando et al. | 310/90.5 X |

*Primary Examiner*—Thomas M. Dougherty
*Assistant Examiner*—Judson H. Jones
*Attorney, Agent, or Firm*—Rabin, Champagne, & Lynt, P.C.

[57] ABSTRACT

A magnetic bearing apparatus comprises a pair of radial magnetic bearings arranged on both sides in the axial direction of an axial magnetic bearing. A pair of first touchdown bearings are arranged at both ends of a spindle. Annular slide bearings are mounted as second touchdown bearings for receiving the spindle on inner peripheral parts of electromagnets in the axial magnetic bearing. The radial internal clearance between the slide bearing and the spindle is larger than the radial internal clearance between the first touchdown bearings and the spindle and is smaller than the radial internal clearance between the radial magnetic bearings and the spindle. Even if a central part of the spindle is deflected at the time of emergency stop, both the first touchdown bearings and the slide bearings receive the spindle, so that the load on the first touchdown bearings can be reduced.

6 Claims, 2 Drawing Sheets

MAGNETIC BEARING APPARATUS

BACKGROUND OF THE INVENTION

1. Field of the Invention

The present invention relates to a magnetic bearing apparatus for radially and axially supporting a spindle with a clearance therebetween.

2. Description of the Related Art

The magnetic bearing apparatus is used as one for supporting a spindle of a machine tool, for example.

Generally in the above-mentioned magnetic bearing apparatus, the position in the axial direction of a rotor disc rotated integrally with a spindle is controlled by a pair of axial magnetic bearings opposite to each other in the axial direction of the spindle with the rotor disc interposed therebetween, so that the spindle is maintained in a predetermined position in the axial direction. On the other hand, the spindle is maintained in a predetermined position in the radial direction by a pair of radial magnetic bearings opposite to each other with both the axial magnetic bearings interposed therebetween in the axial direction of the spindle.

Furthermore, in the magnetic bearing apparatus, touchdown bearings for receiving, when the spindle is stopped, the spindle are respectively arranged at both ends of the spindle. Generally when the spindle is stopped, the rotational speed of the spindle is gradually dropped, and the spindle is brought into contact with the touchdown bearings after the rotational speed is significantly low.

On the other hand, when the magnetic bearing does not instantaneously operate by open circuit or the like, the spindle is brought into contact with the touchdown bearings in a state where it continues to rotate at high speed (for example, 80,000 rpm), and the spindle is supported by the touchdown bearings until the rotation of the spindle is stopped.

However, in cases where an excessive force is applied to the spindle by any cause and a central part of the spindle is deflected by bending at the time of emergency stop, the load applied to the touchdown bearings is excessively increased. Therefore, the touchdown bearings may be damaged before the spindle is stopped. As a result, the spindle and the respective magnetic bearings may, in some cases, be damaged.

SUMMARY OF THE INVENTION

An object of the present invention is to provide a magnetic bearing apparatus capable of preventing touchdown bearings from being damaged at the time of emergency stop of a spindle.

In order to attain the above-mentioned object, in a preferred mode of the present invention, a magnetic bearing apparatus comprises a spindle passed through a housing, a rotor disc fixed to an approximately central part in the axial direction of the spindle, an axial magnetic bearing supported by the housing and including a pair of electromagnets with the rotor disc interposed therebetween for axially supporting the spindle with a clearance therebetween, a pair of radial magnetic bearings supported by the housing in positions on both sides in the axial direction of the axial magnetic bearing for radially supporting the spindle with a clearance therebetween, a pair of first touchdown bearings supported by the housing and opposite to both ends in the axial direction of the spindle, and a pair of second touchdown bearings supported by the housing and opposite to the approximately central part in the axial direction of the spindle. The radial internal clearance between the second touchdown bearings and the spindle is made larger than the radial internal clearance between the first touchdown bearings and the spindle and smaller than the radial internal clearance between the radial magnetic bearings and the spindle.

According to the present embodiment, even if an excessive force is applied to the spindle or the central part of the spindle is deflected at the time of emergency stop, the second touchdown bearings in the approximately central part of the spindle, together with the first touchdown bearings, receive the spindle. Consequently, the load on the first touchdown bearings can be reduced. As a result, it is possible to prevent the first touchdown bearings from being damaged.

Even if the first touchdown bearings are damaged, the spindle can be supported by the second touchdown bearings until the spindle is stopped. At this time, the radial internal clearance between the second touchdown bearings and the spindle is smaller than the radial internal clearance between the radial magnetic bearings and the spindle, so that the spindle is not brought into contact with the radial magnetic bearings. Consequently, the spindle and the respective magnetic bearings are not damaged.

Additionally, it is preferable that the second touchdown bearing is a slide bearing. In this case, a space for arrangement in the radial direction may be smaller, as compared with that in a case where a rolling bearing is used as the second touchdown bearing. Moreover, it is possible to prevent the magnetic bearing apparatus from being increased in size by adding second touchdown bearings. Further, if the second touchdown bearing is a slide bearing, the bearing is easy to replace, resulting in superior maintenance. Further, the possibility that the reliability is decreased due to the damage of a rolling element or a retainer is eliminated.

Furthermore, it is preferable that the second touchdown bearing is a slide bearing disposed in an inner peripheral part of at least one of the electromagnets in the axial magnetic bearing and opposite to the peripheral surface of the spindle.

In this case, the second touchdown bearing is arranged in an inner peripheral part of the axial magnetic bearing, so that the spindle is not brought into contact with the axial magnetic bearing. Further, the length in the axial direction of the spindle need not be increased. Consequently, it is possible to prevent the highest rotational speed from being decreased due to the reduction in the critical rotational speed of the spindle.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

Figure 1:
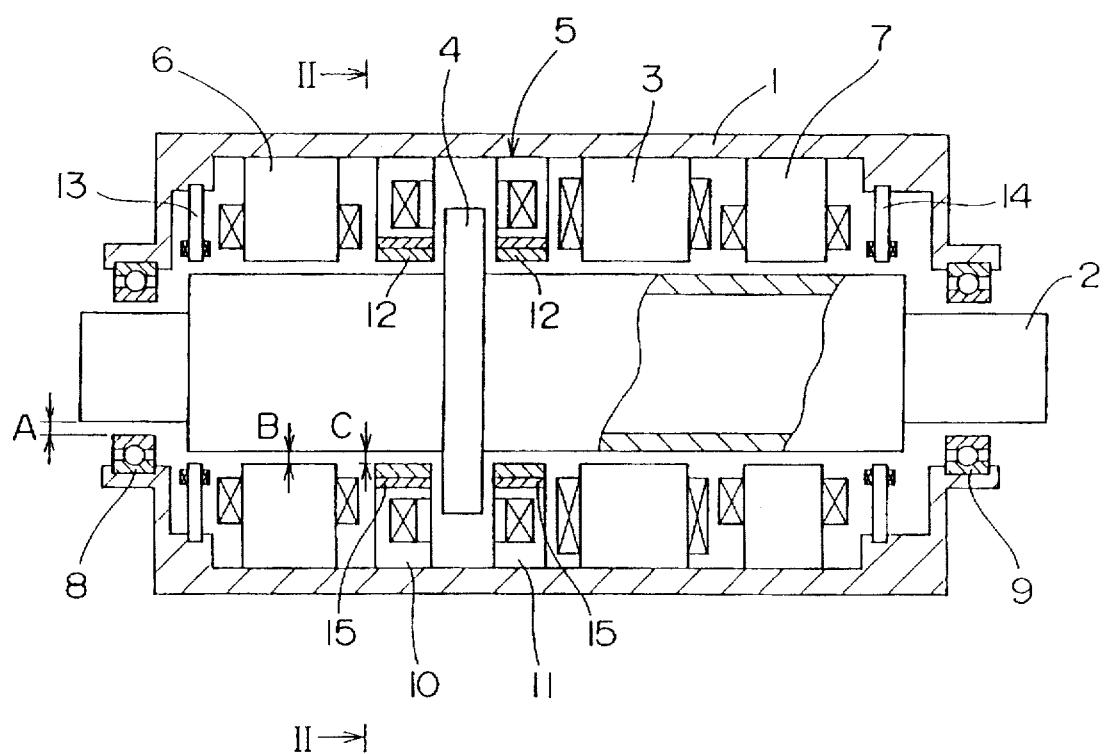
FIG. 1 is a schematic sectional view showing a magnetic bearing apparatus according to one embodiment of the present invention.

An embodiment will be described in detail while referring to the drawings.

Referring to FIG. 1, a magnetic bearing apparatus comprises mainly i) a cylindrical housing 1 serving as a main body,
ii) a spindle 2 passing through the housing 1,
iii) a motor 3 arranged in the vicinity of an approximately central part in the axial direction of the spindle 2 for driving the spindle 2 to rotate,
iv) an axial magnetic bearing 5 arranged adjacent to the motor 3 for controlling the position in the axial direction of the spindle 2 through a rotor disc 4 fixed to the spindle 2,
v) a pair of radial magnetic bearings 6 and 7 respectively arranged on both sides with the motor 3 and the axial magnetic bearing 5 interposed therebetween for controlling the position in the radial direction of the spindle 2, and
vi) a pair of touchdown bearings 8 and 9 respectively arranged at both ends in the axial direction of the spindle 2 and comprising a pair of full type ball bearings.

The touchdown bearings 8 and 9 respectively constitute first touchdown bearing.

The motor 3, the axial magnetic bearing 5, the radial magnetic bearings 6 and 7, and the touchdown bearings 8 and 9 are fixed to the housing 1. Reference numerals 13 and 14 are radial displacement sensors respectively provided so as to correspond to the radial magnetic bearings 6 and 7 for detecting the displacement in the radial direction of the spindle 2, so that attraction forces produced by the radial magnetic bearings 6 and 7 are respectively adjusted depending on the results of the detection by the radial displacement sensors 13 and 14. The illustration of an axial displacement sensor for detecting the displacement in the axial direction of the spindle 2 is omitted.

Each of the axial magnetic bearing 5 comprises a pair of electromagnets 10 and 11 respectively arranged on both sides in the axial direction with the rotor disc 4 interposed therebetween. The electromagnets 10 and 11 are respectively opposite to end surfaces of the rotor disc 4 with predetermined spacing. In actual state, not only one but a plurality of pairs of electromagnets 10 respectively opposite to each other with the spindle 2 interposed therebetween in the radial direction in an annular shape is arranged so as to surround the periphery of the spindle 2. The same applies to the pair of electromagnets 11.

Furthermore, annular slide bearings 12 surrounding the peripheral surface of the spindle 2 with predetermined spacing are removably mounted, respectively, on inner peripheral parts of the electromagnets 10 and 11 through mounting rings 15. The slide bearings 12 respectively comprises rings surrounding the periphery of the spindle 2 and opposite to the peripheral surface of the spindle 2, to constitute second touchdown bearings.

Figure 2:
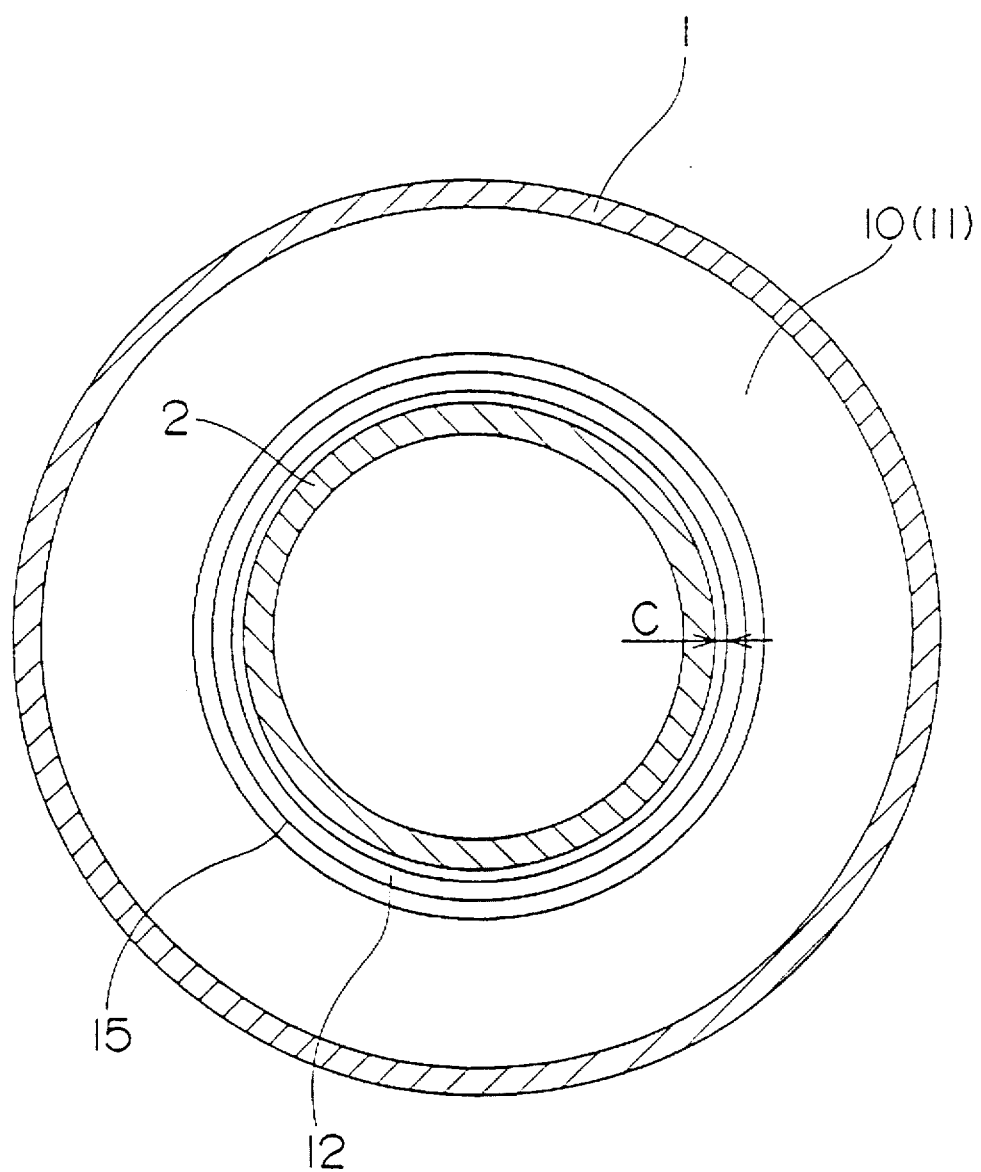
FIG. 2 is a cross-sectional view taken along a line II—II in FIG. 1.

Specifically, as shown in FIGS. 1 and 2, the annular mounting rings 15 are fitted in the inner peripheral part of each of the electromagnets 10 and 11, and the slide bearings 12 are introduced and fitted in an inner peripheral surface of the mounting rings 15 in a state where the inner peripheral surfaces of the mounting rings 15 are coated with lubricating bearing such as molybdenum disulfide. Consequently, the slide bearing 12 can be easily attached and detached. The slide bearing 12 hardly receives a force in the axial direction even at the time of touchdown. Even if the lubricating grease is used as described above, the slide bearing 12 may not be dropped in the axial direction at the time of touchdown.

It is preferable that an alloy containing copper such as brass or gun metal is used as a material used for the slide bearing 12 in terms of smooth sliding guide of the spindle 2. Further, a porous material containing oil may be used.

The present invention is characterized in that the radial internal clearance C between the slide bearings 12 and the spindle 2 is larger than the radial internal clearance A between each of the touchdown bearings 8 and 9 and the spindle 2 and is smaller than the radial internal clearance B between each of the radial magnetic bearings 6 and 7 and the spindle 2. That is, the relationship of A<C<B is satisfied. The radial internal clearance is that obtained by dividing the difference between the diameters of two members to be objects into two equal parts.

According to the present invention in which the above-mentioned relationship of the radial internal clearance is set, even if the spindle 2 is not deflected, for example, at the time of emergency stop, the touchdown bearings 8 and 9 with the smallest radial internal clearance from the spindle 2 is brought into contact with the spindle 2. If the central part of the spindle 2 is deflected, it is considered that it is most greatly deflected in the vicinity of the rotor disc 4. The pair of slide bearings 12 arranged in the vicinity of the rotor disc 4, together with the touchdown bearings 8 and 9, receives the spindle 2. As a result, the load on the touchdown bearings 8 and 9 can be reduced, so that the touchdown bearings 8 and 9 can be prevented from being damaged.

Furthermore, even if the touchdown bearings 8 and 9 are damaged, the spindle 2 is received by the slide bearings 12, and the spindle 2 is not brought into contact with the radial magnetic bearings 6 and 7 because the radial internal clearance C between the slide bearings 12 and the spindle 2 is smaller than the radial internal clearance B between each of the radial bearings 6 and 7 and the spindle 2 (C<B). Moreover, the slide bearings 12 are arranged in the inner peripheral parts of the electromagnets 10 and 11 in the axial magnetic bearing 5, so that the spindle 2 is not brought into contact with the axial magnetic bearing 5. As a result, the spindle 2 and the respective magnetic bearings 5, 6 and 7 can be prevented from being damaged.

If the slide bearings 12 are disposed side by side in the axial direction similarly to the axial magnetic bearing 5 and the radial magnetic bearings 6 and 7, the distance between the radial magnetic bearings 6 and 7 is increased so that the length of the spindle 2 must be increased. Therefore, the critical rotational speed of the spindle 2 is decreased, so that the highest rotational speed is restricted to a low value. On the other hand, if the axial magnetic bearing 5 and the slide bearings 12 are integrated as in the present embodiment, the axial length of the spindle 2 is the same as that in the conventional example, so that the highest rotational speed of the spindle 2 can be kept high.

In the present embodiment, the load on the touchdown bearings 8 and 9 can be reduced. Therefore, a ring composed of a resin material such as a material containing carbon can be also used without using a full type ball bearing having a large load capacity as the touchdown bearings 8 and 9.

Furthermore, in the present embodiment, the slide bearings 12 which are the second touchdown bearings are mounted on the axial magnetic bearing 5 to avoid the reduction in the critical rotational speed. If this point is not a problem, however, the slide bearings 12 may be provided in the other portion of the magnetic bearing apparatus, provided that the portions are in a position corresponding to the approximately central part in the axial direction of the spindle 2.

Additionally, a rolling bearing such as a full type ball bearing used as the first touchdown bearing may be used in place of the slide bearing as the second touchdown bearing.

Further, various bearings such as an aerostatic bearing and an aerodynamic or hydrodynamic bearing can be used as the second touchdown bearing.

In addition thereto, various design changes can be made in the range of the present invention.

Although the present invention has been described and illustrated in detail, it is clearly understood that the same is by way of illustration and example only and is not to be taken by way of limitation, the spirit and scope of the present invention being limited only by the terms of the appended claims.

The disclosure of Japanese Patent Application Serial No. 7-138237, filed on Jun. 5, 1995, is incorporated herein by reference.

What is claimed is:

1. A magnetic bearing apparatus comprising:

a spindle passed through a housing;

a rotor disc fixed to an approximately central part in the axial direction of the spindle;

an axial magnetic bearing supported by the housing and including a pair of electromagnets with said rotor disc interposed therebetween for axially supporting the spindle with a clearance therebetween;

a pair of radial magnetic bearings supported by the housing in positions on both sides in the axial direction of the axial magnetic bearing for radially supporting the spindle with a clearance therebetween;

a pair of first touchdown bearings supported by the housing and opposite to both ends in the axial direction of the spindle; and a pair of second touchdown bearings supported by the housing and opposite to the approximately central part in the axial direction of the spindle, a radial internal clearance between the second touchdown bearings and the spindle being larger than a radial internal clearance between the first touchdown bearings and the spindle and smaller than a radial internal clearance between the radial magnetic bearings and the spindle.

2. The magnetic bearing apparatus according to claim 1, wherein said second touchdown bearing is a slide bearing.

3. The magnetic bearing apparatus according to claim 2, wherein said slide bearing is composed of a ring surrounding the periphery of the spindle.

4. The magnetic bearing apparatus according to claim 1, wherein the second touchdown bearing is a slide bearing disposed in an inner peripheral part of at least one of the electromagnets in said axial magnetic bearing and opposite to the peripheral surface of the spindle.

5. The magnetic bearing apparatus according to claim 4, wherein said slide bearing is composed of a ring surrounding the periphery of the spindle.

6. The magnetic bearing apparatus according to claim 5, further comprising an annular mounting member fixed to the inner peripheral part of said electromagnet, said ring being removably fitted in an inner peripheral part of said mounting member and supported by the mounting member.

* * * * *